(12) United States Patent
Brow et al.

(10) Patent No.: US 9,753,932 B1
(45) Date of Patent: Sep. 5, 2017

(54) SPACE ACCOUNTING FOR STORAGE SYSTEM SNAPSHOTS

(71) Applicant: Qumulo, Inc., Seattle, WA (US)

(72) Inventors: Edward Brow, Seattle, WA (US); Nicholas Wilson, Seattle, WA (US); Robert Gebert, Seattle, WA (US); Thomas Scott Urban, Seattle, WA (US); Michael Adam Krasnow, Seattle, WA (US); Steven Haber, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 15/473,051

(22) Filed: Mar. 29, 2017

Related U.S. Application Data

(60) Provisional application No. 62/457,754, filed on Feb. 10, 2017.

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 11/14* | (2006.01) | |

(52) U.S. Cl.
CPC .... *G06F 17/30088* (2013.01); *G06F 11/1469* (2013.01); *G06F 17/30073* (2013.01); *G06F 17/30085* (2013.01); *G06F 17/30091* (2013.01); *G06F 17/30106* (2013.01); *G06F 17/30117* (2013.01); *G06F 2201/84* (2013.01)

(58) Field of Classification Search
CPC .......... G06F 17/30088; G06F 11/1469; G06F 17/30073; G06F 17/30085; G06F 17/30091; G06F 17/30106; G06F 17/30117; G06F 2201/84
See application file for complete search history.

(56) References Cited

U.S. PATENT DOCUMENTS

| | | | |
|---|---|---|---|
| 8,806,154 B1 * | 8/2014 | Gupta | ................. G06F 11/1448 711/156 |
| 9,547,560 B1 * | 1/2017 | Lee | ...................... G06F 11/1451 |
| 2006/0271604 A1 * | 11/2006 | Shoens | ............. G06F 17/30088 |
| 2008/0082593 A1 * | 4/2008 | Komarov | ............ G06F 11/1451 |
| 2014/0156956 A1 * | 6/2014 | Ezra | ........................ G06F 3/065 711/162 |
| 2016/0314046 A1 * | 10/2016 | Kumarasamy | ...... G06F 11/1435 |

* cited by examiner

*Primary Examiner* — Azam Cheema
(74) *Attorney, Agent, or Firm* — John W. Branch; Lowe Graham Jones PLLC

(57) ABSTRACT

A facility for snapshot space accounting for a storage system, such as a filesystem is disclosed. The facility enables users to quickly and easily determine the amount of storage space that would be released or recovered if a snapshot were to be purged. The facility may work in conjunction with, or as part of, a snapshot service. The facility maintains an expiration data structure and a count data structure and uses these data structures in implementing the disclosed snapshot space accounting techniques. The expiration data structure represents the life cycle of each snapshot element maintained by the facility while the count data structure represents, for pairs of snapshots, the size of the information stored in the snapshot data that expired and that spans the corresponding pair of snapshots.

19 Claims, 7 Drawing Sheets

SPACE ACCOUNTING FOR STORAGE SYSTEM SNAPSHOTS

CROSS-REFERENCE TO RELATED APPLICATIONS

This application claims the benefit of U.S. Patent Application No. 62/457,754 entitled "SPACE ACCOUNTING FOR STORAGE SYSTEM SNAPSHOTS," filed on Feb. 10, 2017, which is herein incorporated by reference in its entirety. This application is related to U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled "DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional application Ser. No. 14/595,043 entitled "FILESYSTEM HIERARCHICAL AGGREGATE METRICS," filed on Jan. 12, 2015; U.S. Non-Provisional application Ser. No. 14/595,598 entitled "FAIR SAMPLING IN A HIERARCHICAL FILESYSTEM," filed on Jan. 13, 2015; U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015; and U.S. Non-Provisional application Ser. No. 14/859,114, entitled "FILESYSTEM HIERARCHICAL CAPACITY QUANTITY AND AGGREGATE METRICS," filed on Sep. 18, 2015, each of the above-mentioned applications is herein incorporated by reference in its entirety. In cases where the present application and a document incorporated herein by reference conflict, the present application controls.

TECHNICAL FIELD

The described technology is directed to the field of filesystems.

BACKGROUND

Enterprise filesystems can store large volumes of data on behalf of large numbers of users. These filesystems can have thousands of accounts, each account storing any amount of data. Enterprises, businesses, and individuals alike now use large-scale filesystems to make stored data remotely accessible via a network, such as a cloud-based storage environment. Such filesystems are often accessible via closed (e.g., enterprise) and open (e.g., Internet) networks and allow concurrent access via multiple client devices. Furthermore, the amount of data stored for a particular account may grow or shrink without notice, such as by creating, deleting, and/or modifying files.

DETAILED DESCRIPTION

Figure 1:
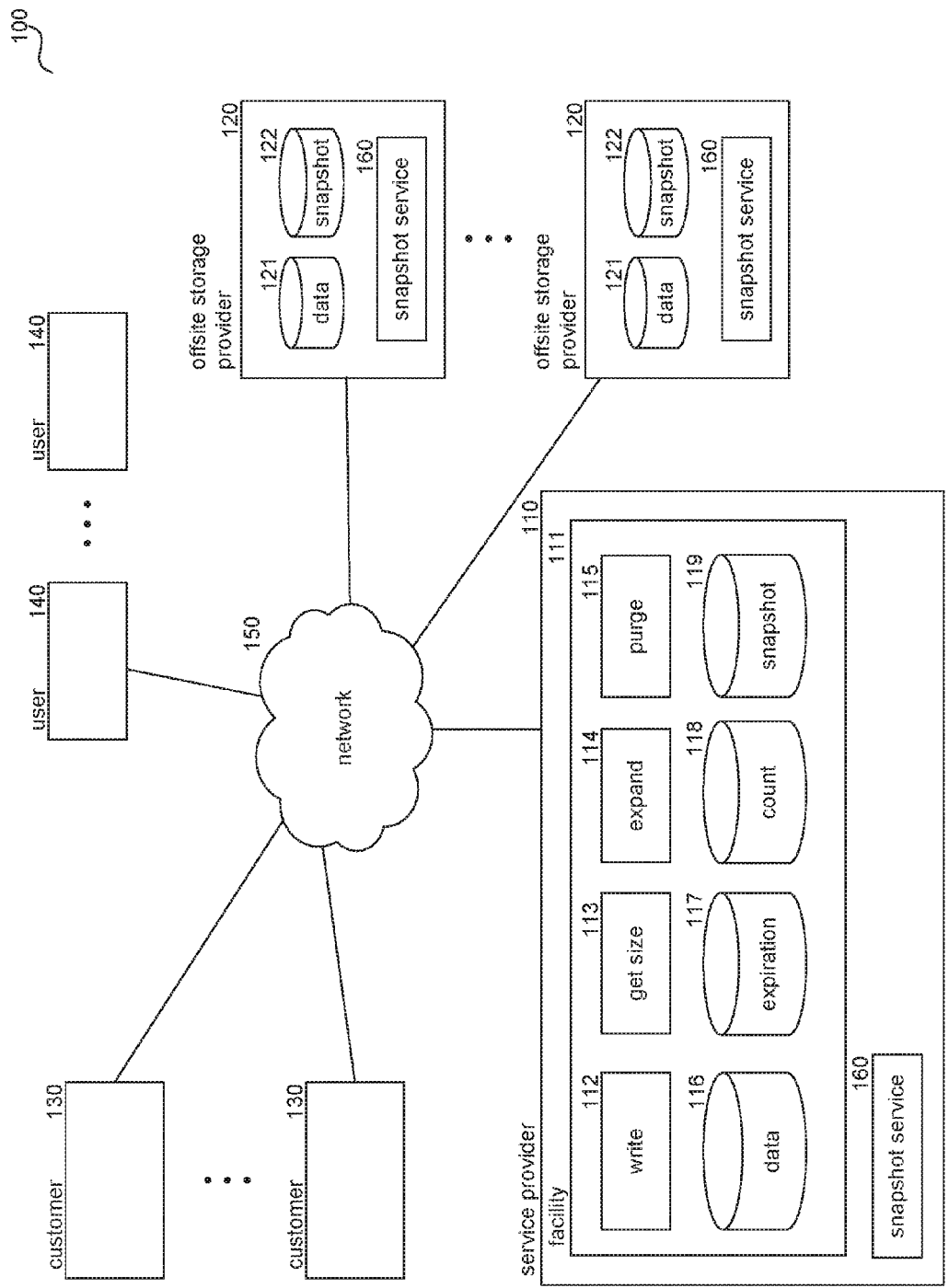
FIG. 1 is a block diagram illustrating an environment in which the facility may operate.

Users, such as account administrators, account holders, and/or storage system managers, benefit from being able to restore previous versions of entire filesystems or portions thereof. In many cases, filesystems implement a "snapshot" service that periodically captures the state of individual filesystem objects (e.g., files, directories, filesystem subtrees, or an entire filesystem) so that these objects can be "rolled back" to a previous version in the event that, for example, important information was inadvertently deleted, edited, lost, etc. In some cases, snapshotted data can be accessed without being "rolled back" in this way. A snapshot service may capture and store an entire copy of the filesystem object each time it takes a snapshot. The snapshot service may implement the snapshots under the control of one or more snapshot policies, each snapshot policy identifying one or more filesystem objects and a frequency at which the corresponding filesystem objects are to be recorded for the purpose of generating another snapshot. In this manner, a user, administrator, etc. can define the rate at which individual snapshots are generated, thereby having some effect on the rate at which filesystem space is consumed by snapshot data.

In some cases, rather than capturing and storing entire copies of a filesystem object, a snapshot service maintains information about the pieces of the filesystem object that have changed since a previous snapshot was recorded. For example, if at a current time only one 4 MB file in a 100 TB filesystem has changed relative to a previous snapshot, it could be prohibitive, both in terms of time and storage space, to create a 100 TB snapshot that reflects only the changes to the 4 MB file. Likewise, if the only changes to the 4 MB file were to seven blocks or clusters of 4 KB each (e.g., 28 KB (7×4 KB)), it could be prohibitive to create a 100 TB snapshot that reflects only these 28 KB of changes to the 4 MB file. Thus, the snapshot service can maintain a representation of the changes to the filesystem over time without requiring the entire filesystem structure or even entire filesystem objects to be stored and maintained as part of each snapshot. In this manner, each snapshot represents the changes that occurred during the period of time between the time the snapshot was recorded and the time the previous snapshot was recorded; this period of time is referred to herein as an epoch. Thus, each snapshot represents the changes that occurred during the epoch that was ended by this snapshot. Accordingly, in the examples used herein, each snapshot is numbered and has a corresponding preceding epoch that is given the same number. One of ordinary skill in the art will recognize that the relationships between epochs and corresponding snapshots may be maintained using alternative arrangements, such as a mapping table, index, etc. In some embodiments, the system maintains an epoch counter that represents the current epoch number each time a new snapshot is created, and the facility assigns the current epoch counter value to the new snapshot and then increments the current epoch counter. In some cases, the facility may use a data structure other than an epoch counter to track snapshots, such as a date/time value, and so on.

Although this technique for recording and maintaining snapshots provides significant savings both in terms of time and storage, it is not without its disadvantages. Because each snapshot represents data that may be current at the time a future snapshot is generated (or may be current at the present time), the snapshot service cannot, in all cases, simply delete an entire snapshot without unintended consequences. Rather, when a snapshot is selected for deletion, portions of the snapshot are selectively "purged" to ensure that current information or information relevant to an existing snapshot remains intact. In other words, the entire snapshot is not necessarily deleted.

For example, if snapshot 2, the earliest available snapshot in this example (where "2" represents a snapshot identifier for the corresponding snapshot), includes changes to blocks A and C (e.g., an overwrite or deletion), snapshot 3 (recorded after snapshot 2) includes changes to block A, and snapshot 4 (recorded after snapshot 3) includes changes to blocks A, B, and C, deleting snapshot 2 in its entirety would make it impossible to accurately retrieve the "snapshot 3" version of C since the version of C that existed at the time snapshot 3 was recorded was stored as part of snapshot 2. However, some portions of the snapshot may be safely deleted without these unintended consequences. For example, deleting snapshot 2 in its entirety would not have the same impact on the "snapshot 3" version of A since an updated version of A was recorded in snapshot 3 (because A was overwritten or deleted during epoch 3). Accordingly, the snapshot service could safely delete the changes to A stored in snapshot 2 without preventing the service from later retrieving the snapshot 3 version of A. Thus, when a snapshot is "purged," only the portions of the snapshot that are safe for deletion are removed, while the other portions remain stored in the snapshot data. Typical snapshot services do not provide a means for users to quickly and easily determine which portions of a snapshot can safely be deleted without impacting earlier snapshots. Accordingly, these techniques can make it difficult to quickly determine the amount of snapshot data that can be deleted if a corresponding snapshot or snapshots (or portions thereof) were purged and/or for users to determine how much space will be recovered or released when a snapshot is purged. The inventors have found that a new approach to snapshot management and snapshot space accounting would have significant utility.

A software and/or hardware facility for snapshot space accounting for a storage system, such as a filesystem (the "facility") is disclosed. The facility enables users to quickly and easily determine the amount of storage space that would be released or recovered if a snapshot were to be purged. Although described herein as maintaining snapshot data at a block-level granularity (i.e., each snapshot element corresponding to an individual, logical block of data in the filesystem), one of ordinary skill in the art will recognize that the disclosed facility can be configured to provide snapshots at varying levels of granularity by using different "snapshot elements" as a basis for recording snapshot data, such as individual files, groups of blocks, directories, etc. In the examples used herein, each snapshot element represents a block of data in the filesystem that is recorded as part of a snapshot. The facility may work in conjunction with, or as part of, a snapshot service.

In some embodiments, the facility maintains an expiration data structure and a count data structure, and uses these data structures in implementing the disclosed snapshot space accounting techniques. The expiration data structure represents the life cycle of each snapshot element maintained by the facility. Each entry in the expiration data structure represents the snapshot during which the data in the snapshot element was first recorded in a snapshot and the epoch during which the information in the snapshot element was overwritten (i.e., when that information "expired" in the chronological snapshot/epoch history). In some embodiments, each entry in the expiration data structure includes a "birthdate," which corresponds to the snapshot during which the information represented by the corresponding snapshot element was first recorded as part of a snapshot, an "expiration date," which corresponds to the epoch during which the corresponding snapshot element was next modified, and an indication of the corresponding snapshot element, such as a label, address, etc. In some cases, the component only adds an entry to the expiration data structure if the current epoch is greater than the block's birthdate, so that multiple entries are not added to the expiration data structure for multiple changes to the same block within a single epoch. For example, if a block labeled "A" were modified during epoch 1 and then written over during epoch 7, the expiration data structure would have an entry such as: (1, 7, A). Thus, the entry reflects that the last value or values written to the block labeled "A" during epoch 1 (and subsequently recorded in snapshot 1) remained unchanged until they were modified during epoch 7. As another example, if block "A" was next modified during epoch 9, the expiration data structure would have an entry such as: (7, 9, A). Thus, the entry reflects that the last value or values written to the block labeled "A" during epoch 7 (and subsequently recorded in snapshot 7) remained unchanged until they were modified again during epoch 9. In some embodiments, an entry is added to the expiration data structure each time the filesystem performs a write operation on a filesystem object that is subject to an active snapshot policy. In some embodiments, if entries in the expiration data structure can represent snapshot elements with different sizes (i.e., if the size is not fixed), then each entry may also include an indication of the corresponding size.

In some embodiments, the count data structure represents, for pairs of snapshots, the size of the information stored in the snapshot data that expired and that spans the corresponding pair of snapshots. In other words, for each pair of snapshots, the count data structure stores, in an entry corresponding to that pair, an indication of the amount of expired snapshot information that has a birthdate equal to the earlier of the two snapshots and an expiration date equal to the later of the two snapshots. Each entry in the count data structure includes a birthdate, expiration date, and size. In some embodiments, if all of the snapshot elements are of a fixed size, the count data structure may store a count of the elements for each pair of snapshots rather than their actual size. Each time an entry is added to the expiration data structure, a corresponding change is made in the count data structure that represents the size of the change that prompted the addition of the new entry to the expiration data structure. For example, in addition to (1, 7, A) being added to the expiration data structure in the example above, a corresponding change representing the size of the block labeled "A" would have been made to the count data structure as well: if the count data structure already includes an entry for the pair (1, 7), the size of "A" is simply added to the pre-existing size value for the pair; if the count data structure had not already included an entry for the pair (1, 7), then the facility would generate a new entry for (1, 7) and set the size value of the entry equal to the size of "A." In this example, the size of "A" is the size of one block in the system. In other words, the counts stored in the count data structure in this example are in units of storage system blocks (e.g., 4 KB). In other examples the size may represent the size of a corresponding file or other filesystem object represented by a corresponding snapshot element. In some embodiments, when one or more snapshots are purged, the facility deletes any corresponding entries in the expiration data structure and decrements the corresponding count data structure entry as necessary. Furthermore, if the corresponding count data structure entry reaches 0, the facility may delete the corresponding entry entirely.

In some embodiments, the facility determines the size of the snapshot data that can be safely deleted when a particular snapshot is purged by using the count data structure to identify the size of the information that has a birthdate corresponding to the particular snapshot and that has an expiration date corresponding to the following snapshot. In other words, the facility identifies the size of the information that was written during the epoch prior to the generation of the snapshot and that expired during the next epoch. For example, if a user wanted to know how much storage space would be recovered if snapshot 2 were purged (and no snapshots have yet been deleted), the facility would query the count data structure for an entry corresponding to (2, 3). If there is an entry, then the facility would return the corresponding size value stored for the entry; otherwise the facility would return a value of 0 since no information stored in snapshot 2 could safely be deleted. Thus, the appropriate range of snapshots for size and purge analysis for a single snapshot includes the snapshot itself and the immediately following snapshot.

In some embodiments, the facility may provide an indication of how much information would be recovered if a contiguous range of snapshots were purged. As discussed above with respect to a single snapshot, the facility uses the count data structure to provide this information with a range of snapshots. However, in addition to checking the count data structure for each individual snapshot in the range as discussed above, the facility also expands the query to include each chronologically-ordered combination of pairs in the range so that appropriate "overlapping" ranges are also included (i.e., the ranges corresponding to snapshots that were born and expired during a user-provided range). As a new example, if a user wanted to know how much storage space would be recovered if snapshots 3-6 were purged (and no snapshots have yet been deleted), the facility would query the count data structure for entries corresponding to:

I: (3, 4), (4, 5), (5, 6), (6, 7); and

II: (3, 5), (3, 6), (3, 7), (4, 6), (4, 7), (5, 7).

These additional ranges need to be checked because any snapshot elements that were both born and expired anytime during that range can safely be deleted as part of the purge since they did not exist outside of the user-given range, even if their birthdates and expiration dates are not necessarily coterminous with the user-provided range. Thus, the appropriate range of snapshots for size and purge analysis for a contiguous range of snapshots (with no adjacent deleted snapshots) begins with the earliest snapshot in the contiguous range and ends with the snapshot immediately following the latest snapshot in the contiguous range.

In some embodiments, the facility may also expand a user-provided snapshot and/or snapshot range to capture ranges of snapshots that include snapshots that have already been deleted. As a new example, if a user wanted to know how much storage space would be recovered if snapshot 4 were purged and snapshots 3 and 5 had already been deleted but snapshots 2 and 6 had not been deleted, the facility would expand the user-provided range (in this case the user-provided range begins and ends with snapshot 4) to include snapshots 3, 4, and 5. This range would then be expanded to include all overlapping ranges, as discussed above (i.e., (3, 4), (3, 5), (3, 6), (4, 5), (4, 6), and (5, 6)). In this manner, any snapshot element with a birthdate and expiration date in the generated range will be included in the determination. Thus, the appropriate range of snapshots for size and purge analysis for a particular snapshot that is chronologically adjacent to one or more deleted snapshots (i.e., has one or more deleted snapshots between it and another non-deleted snapshot) includes the deleted snapshots that immediately precede the snapshot (i.e., up to, but not including, the latest non-deleted snapshot that precedes the particular snapshot), the deleted snapshots that immediately follow the particular snapshot, and the following snapshot (i.e., up to and including the earliest non-deleted snapshot that follows the particular snapshot).

The disclosed technology offers several benefits over other techniques for storage system snapshot space accounting. In other snapshot space accounting systems, the system must traverse actual snapshot data (i.e., the data stored as part of the snapshots) to determine whether removing a portion thereof will have any unintended consequences with respect to retrieving other snapshots. This traversal can take up valuable resources in the corresponding system, thereby delaying the execution of other operations in the filesystem. In some cases, a user does not know how much data will actually be recovered if a snapshot is purged until the user performs the delete operation and the snapshot system analyzes the entire snapshot structure. Accordingly, the user cannot accurately predict how much data will be recovered and may end up with less or more than expected. For example, a user may attempt to purge a snapshot that itself has a size of 100 GB only to find out hours or days later that the snapshot service was only able to safely remove 3 GB because the snapshot included a significant amount of information that was still current when subsequent snapshots were generated and/or is still current. The installation and use of the disclosed space accounting facility, in contrast, enables an organization or other party to quickly and easily determine the amount of information that will be recovered when one or more snapshots are purged. Thus, the disclosed facility improves the ability of computers to maximize the usefulness of a shared storage system to users while simultaneously managing snapshot data within the storage system.

FIG. 1 is a block diagram illustrating an environment in which the facility may operate in accordance with some embodiments of the disclosed facility. The environment 100 includes service provider 110, offsite storage providers 120, customers 130, users 140, and network 150. Service provider 110 provides the facility for snapshot space accounting within a filesystem and is comprised of facility 111, which includes write component 112, get size component 113, expand component 114, purge component 115, data store 116, expiration data structure 117, count data structure 118, and snapshot store 119. Write component 112 is invoked by the facility to write to a filesystem object, such as a block of a file, while maintaining appropriate snapshot information in accordance with the disclosed facility. Get size component 113 is invoked by the facility to determine the size of the storage space that would be recovered if one or more selected snapshots were purged. Expand component 114 is invoked by the facility to identify chronologically adjacent deleted snapshots for a selected snapshot. Purge component 115 is invoked by the facility to identify and remove snapshot elements that can be deleted. In some embodiments, data store 116 may include additional stores, such as remote or distributed storage systems, and so on. Snapshot store 119 includes stored snapshot information, such as snapshot identification information, when a snapshot was stored, the information stored as part of the snapshot, and so on. Offsite storage providers 120 offer storage space for the filesystem and are comprised of data store 121 and snapshot store 122, which includes stored snapshot information, such as snapshot identification information, when a snapshot was stored, the information stored as part of the snapshot, and so on. Accordingly, in various embodiments, the facility is configured to manage snapshot space accounting for distributed and non-distributed filesystems. Customers 130 represent the filesystem accountholders and may include individuals, organizations, system administrators, and so on. These customers may have established relationships with the service provider 110 and/or offsite storage providers 120 and may interact with their corresponding filesystems directly or via network 150. Users 140 represent the users that interact with the filesystem, either directly or via network 150. In this example, the service provider 110 and offsite storage providers 120 each include snapshot service component 160, which generates, stores, and maintains snapshot data in accordance with one or more snapshot policies in conjunction with the facility.

The computing devices on which the facility is implemented may include a central processing unit, memory, input devices (e.g., keyboard and pointing devices), output devices (e.g., display devices), and storage devices (e.g., disk drives), such as computer-readable storage media. Computer-readable storage media include, for example, tangible media such as hard drives, CD-ROMs, DVD-ROMS, and memories such as ROM, RAM, and Compact Flash memories that can store instructions and other storage media. The phrase "computer-readable storage medium" does not describe propagating, transitory signals and should not be interpreted as propagating, transitory signals. In addition, the instructions, data structures, and message structures may be stored or transmitted via a data transmission medium, such as a signal on a communications link and may be encrypted. The term "data transmission medium" should not be interpreted as computer-readable storage media nor should it be interpreted as signals traversing the medium. Various communications links may be used, such as the Internet, a local area network, a wide area network, a point-to-point dial-up connection, a cell phone network, and so on and may be encrypted.

Embodiments of the facility may be implemented in and used with various operating environments and systems that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The facility may be described in the general context of computer-executable instructions, such as program modules, executed by one or more computers or other devices. Further, such functions correspond to modules, which are software, hardware, firmware, or any combination thereof. Modules can be implemented in a variety of forms, including executable code, interpreted code, translated code, etc. Multiple functions can be performed in one or more modules as desired, and the embodiments described are merely examples. A digital signal processor, ASIC, microprocessor, or any other type of processor operating on a system, such as a personal computer, server computer, supercomputing system, router, or any other device capable of processing data including network interconnection devices executes the software. Those skilled in the art will appreciate that any logic illustrated in the Figures (e.g., flow diagrams), may be altered in a variety of ways. For example, the order of the logic may be rearranged, sublogic may be performed in parallel, illustrated logic may be omitted, other logic may be included, etc. Typically, the functionality of the program modules may be combined or distributed as desired in various embodiments.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
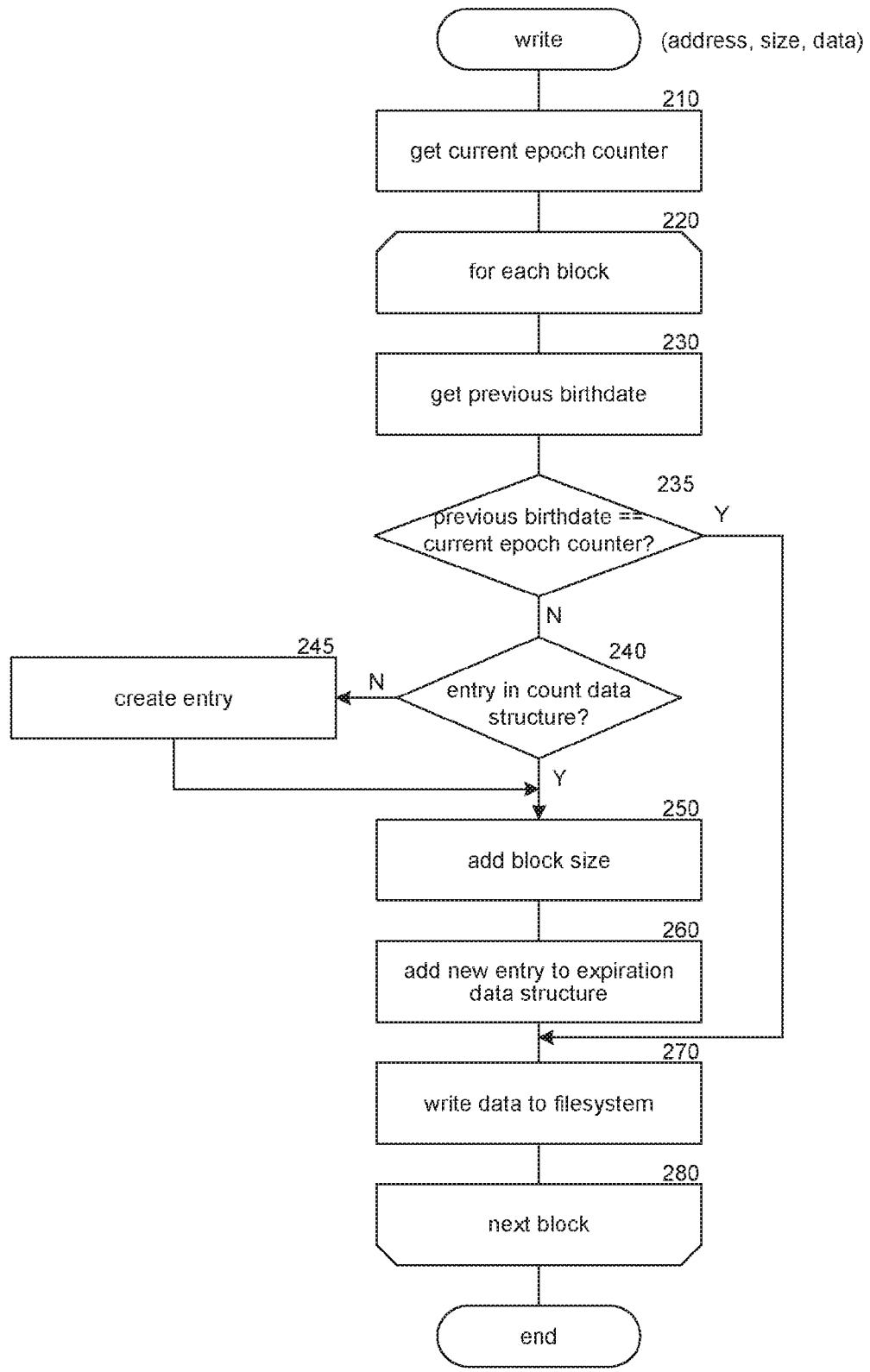
FIG. 2 is a flow diagram illustrating the processing of a write component.

FIG. 2 is a flow diagram illustrating the processing of a write component in accordance with some embodiments of the disclosed facility. The facility invokes the write component to perform a requested write operation on a filesystem object or objects, such as a block of a file, while maintaining appropriate snapshot information in accordance with the disclosed facility. In this example, the component receives as input an address (identifying the first block to be written), a size (representing the size of the requested write operation in terms of blocks), and data to be written. In block 210, the component retrieves a current value for an epoch counter. As discussed above, each epoch represents a time between snapshots. In this example, each snapshot is numbered to represent the information that was stored at the end of the epoch with the same number. In some embodiments, the facility maintains different epoch counters for different entities, such as different users, different snapshot policies, and so on. In blocks 220-280, the component loops through each of the blocks that are to be written and maintains snapshot information in accordance with the disclosed facility. In block 230, the component retrieves the birthdate for the value previously stored in the block. In some embodiments, the filesystem may maintain, for each current block in the filesystem, the snapshot during which the block was last recorded, such as in metadata associated with the block, a separate data structure, an inode, etc. Thus, this information can be retrieved from the filesystem directly. In some embodiments, this information can be retrieved from a corresponding snapshot service. If this is the first time that the block has been written, then the component loops back to block 220 to select the next block. In decision block 235, if the retrieved birthdate is equal to the current epoch counter, then the component continues at block 270, else the component continues at decision block 240. In decision block 240, if there is an entry for the pair corresponding to the retrieved birthdate and the current epoch counter, then the component continues at block 250, else the component continues at block 245. In block 245, the component creates an entry in the count data structure for the pair. In block 250, the component adds the size of the block to the corresponding entry in the count data structure. In block 260, the component adds a new entry to the expiration data structure, which includes the retrieved birthdate, the current epoch counter, and an indication of the block. In block 270, the component writes the received value to the corresponding block(s) in the system. In some cases, the component may cause additional information to be stored, such as the value being overwritten, the previous birthdate for the block, a timestamp for the previous and/or current write, and so on in metadata associated with the block, a separate data structure, an inode, etc. In block 280, if there are any blocks left to be written, then the component selects the next block and loops back to block 220 to process the next block, else processing of the component completes.

Figure 3:
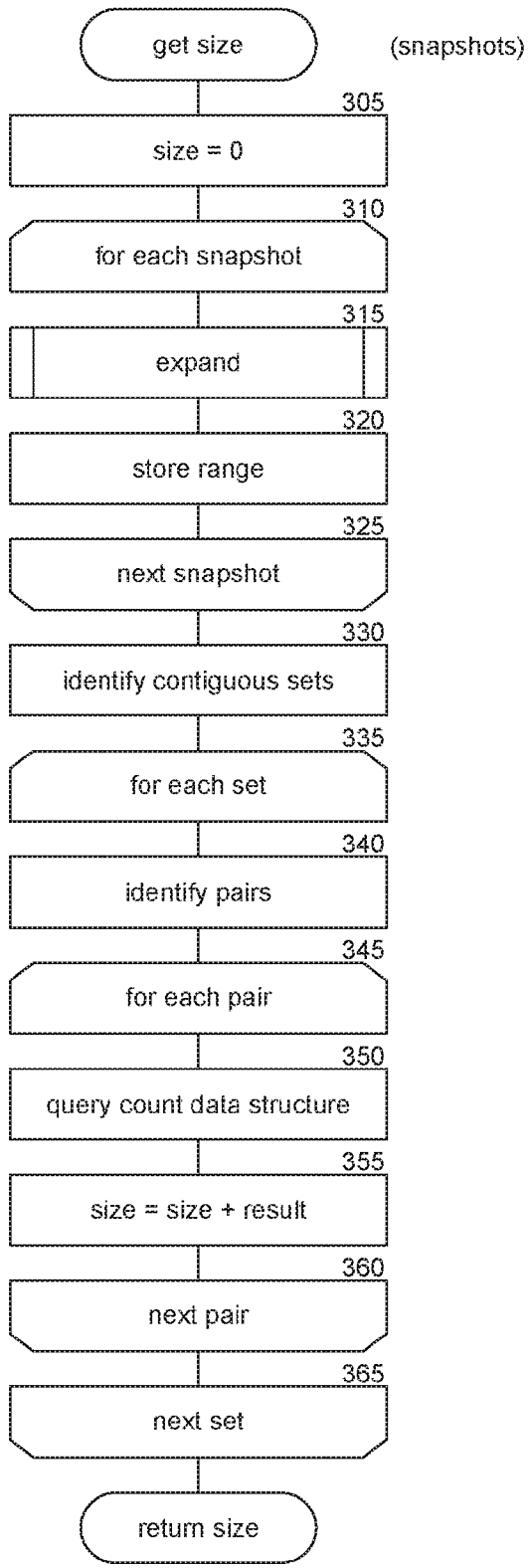
FIG. 3 is a flow diagram illustrating the processing of a get size component.

FIG. 3 is a flow diagram illustrating the processing of a get size component in accordance with some embodiments of the disclosed facility. The facility invokes the get size component to determine the size of the storage space that would be recovered if one or more selected snapshots were purged. In this example, the input to the component includes a set of one or more snapshots. In block 305, the component initializes a size variable by setting it equal to 0. In blocks 310-325, the component loops through each snapshot in the received set of snapshots to expand its range to include any adjacent (e.g., chronologically) deleted snapshots. In block 315, the component invokes an expand component for the currently selected snapshot. In block 320, the component stores the range of one or more snapshots generated by the expand component. In block 325, if there are any snapshots left to be expanded, then the component selects the next snapshot and loops back to block 310 to process the next snapshot, else processing of the component continues at block 330. In block 330, the component performs a union of the snapshots generated by the expand component for each of the snapshots received as input and identifies the contiguous sets of generated snapshots. For example, if the component received snapshots 3, 7, and 11 and the expand component generated ranges: 2-5, 7-9, and 9-13, the component would identify the contiguous ranges as: 2-5 and 7-13. In blocks 335-365, the component loops through each of the identified contiguous sets of snapshots to determine the size of the data that would be recovered if the contiguous set of snapshots were purged. In block 340, the component identifies each unique set of chronologically-ordered pair of snapshots in the currently selected set of snapshots. For example, the chronologically-ordered pairs for 2-5 are (2, 3), (2, 4), (2, 5), (3, 4), (3, 5), and (4, 5). The number of chronologically-ordered pairs for a given contiguous set of snapshots is $((n*(n-1))/2)$, where n equal the number of elements in the set. In the above example, the number of elements in 2-5 is 4 and the number of ordered pairs is 6 (i.e., $((4*(4-1))/2)$). In blocks 345-360, the component loops through each of the identified pairs to determine the amount of expired snapshot data that is stored for snapshot elements with birthdates equal to the earlier of the two snapshots in the pair and expiration dates equal to the later of the two snapshots in the pair. In block 350, the component queries the count data structure for the currently selected pair to retrieve the size of the snapshot data corresponding to that pair. In block 355, the component adds the result of the query to the size variable. If the count data structure does not include an entry for the pair, then the size variable does not change for the pair. In block 360, if there are any pairs left to be analyzed, then the component selects the next pair and loops back to block 345 to process the next pair, else processing of the component continues at block 365. In block 365, if there are any sets left to be analyzed, then the component selects the next set and loops back to block 335 to process the next set, else processing of the component completes.

Figure 4:
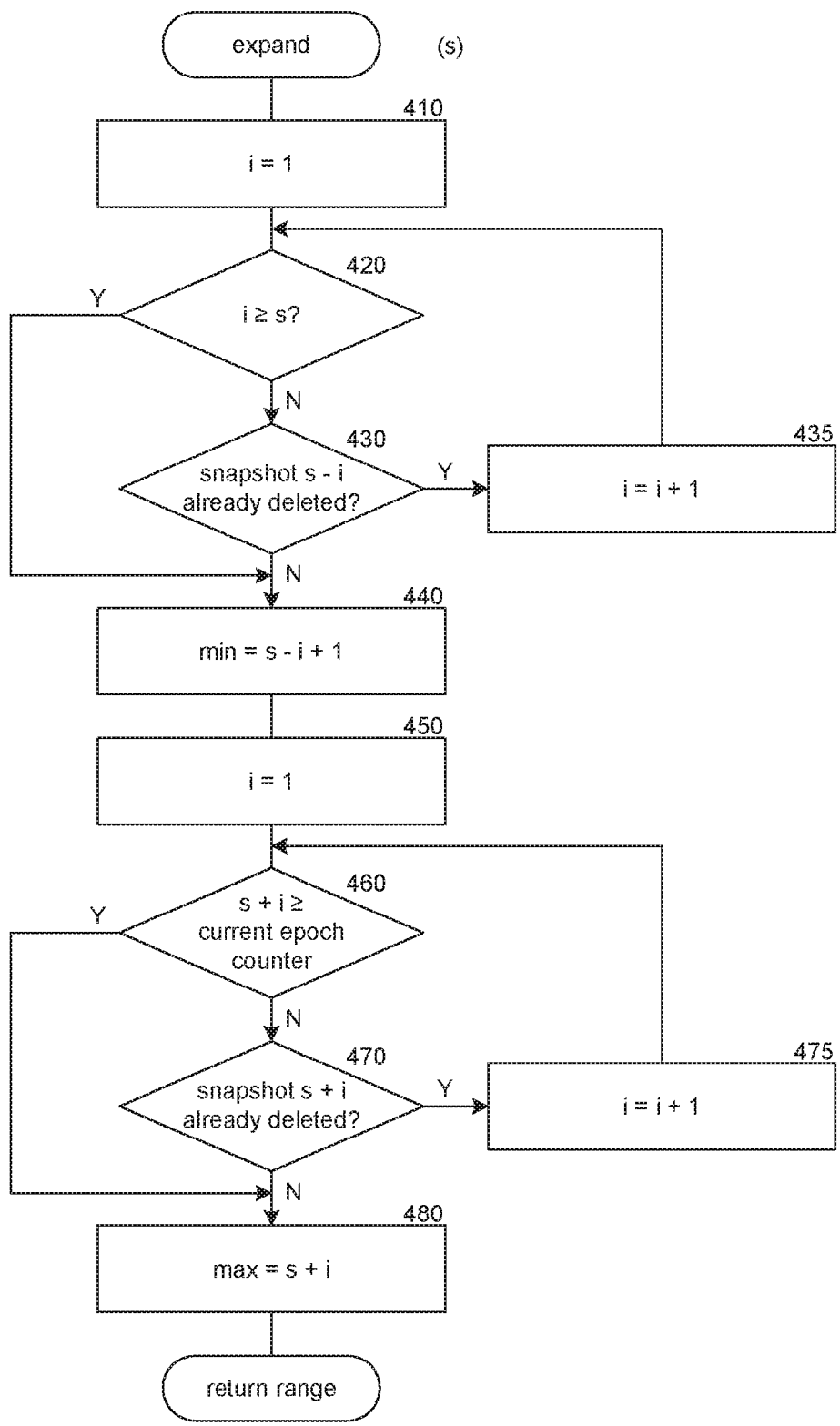
FIG. 4 is a flow diagram illustrating the processing of an expand component.

FIG. 4 is a flow diagram illustrating the processing of an expand component in accordance with some embodiments of the disclosed facility. The facility invokes the expand component to identify chronologically adjacent, deleted snapshots for a selected snapshot and the following snapshot to identify the appropriate range of snapshots for purge analysis. In this example, the component receives a single snapshot identifier as input (referred to as "s" herein). In block 410, the component initializes a counter variable ("i") to 1. In decision block 420, if i is greater than or equal to s, then the component continues at block 440, else the component continues at decision block 430. In decision block 430, if the snapshot with the value (s−i) has already been deleted, then the component continues at block 435, else the component continues at block 440. In block 435, the component increments i by 1 and loops back to decision block 420. In block 440, the component sets a min value equal to (s−i+1). The min value represents the earliest snapshot relevant to the purge analysis for the received snapshot identifier. In block 450, the component reinitializes i to 1. In decision block 460, if (s+i) is greater than or equal to the current epoch counter, then the component continues at block 480, else the component continues at decision block 470. In decision block 470, if the snapshot with the value (s+i) has already been deleted, then the component continues at block 475, else the component continues at block 480. In block 475, the component increments the value of i by 1 and loops back to decision block 460. In block 480, the component sets a max value equal to (s+i). The max value represents the latest snapshot relevant to the purge analysis for the received snapshot identifier. The component then returns the range: (min, max).

Figure 5:
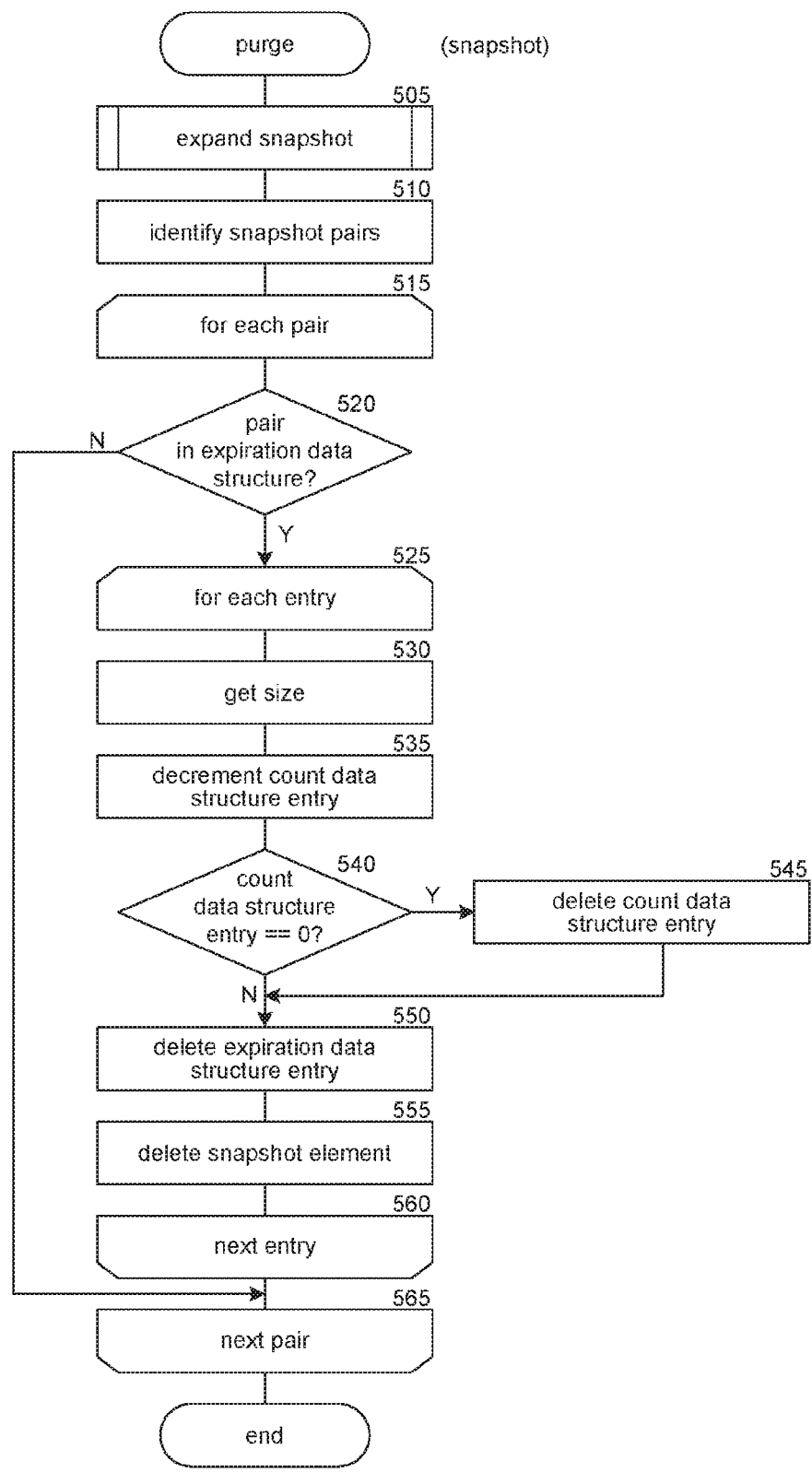
FIG. 5 is a flow diagram illustrating the processing of a purge component.

FIG. 5 is a flow diagram illustrating the processing of a purge component in accordance with some embodiments of the disclosed facility. The facility invokes the purge component to identify and remove snapshot elements that can be deleted in response to receiving a request to purge a corresponding snapshot. The component receives a snapshot identifier as input. In block 505, the component invokes an expand snapshot component to identify the appropriate range of snapshots for size and purge analysis. In block 510, the component identifies the snapshot pairs in the expanded range. As discussed above, the number of pairs is equal to $((n*(n-1))/2)$ where n is equal to the number of elements in the expanded range. In blocks 515-565, the component loops through each pair to purge any snapshot elements corresponding to the range defined by the currently selected pair. In decision block 520, if there are one or more entries in the expiration data structure corresponding to the currently selected pair, then the component continues at block 525, else the component continues at block 565. In blocks 525-560, the component loops through each entry in the expiration data structure corresponding to the currently selected pair to maintain the expiration data structure and count data structure. In block 530, the component determines the size (or count) of the snapshot element corresponding to the currently selected entry. For example, if the snapshot elements represented in the expiration data structure are of a fixed size, then the determined size is the fixed size. Otherwise, the component may retrieve the size from the expiration data structure. In block 535, the component decrements the count data structure entry for the currently selected pair by the size of the entry (or the number of snapshot elements represented by the entry). In decision block 540, if the size or count value in the count data structure is equal to 0, then the component continues at block 545, else the component continues at block 550. In block 545, the component deletes the entry for the currently selected pair in the count data structure. In block 550, the component removes the currently selected expiration data structure entry from the expiration data structure. In block 555, the component deletes the corresponding snapshot element. In block 560, if there are any expiration data structure entries left to be analyzed, then the component selects the next entry and loops back to block 525 to process the next entry, else processing of the component continues at block 565. In block 565, if there are any pairs left to be analyzed, then the component selects the next pair and loops back to block 515 to process the next pair, else processing of the component completes.

Figure 6:
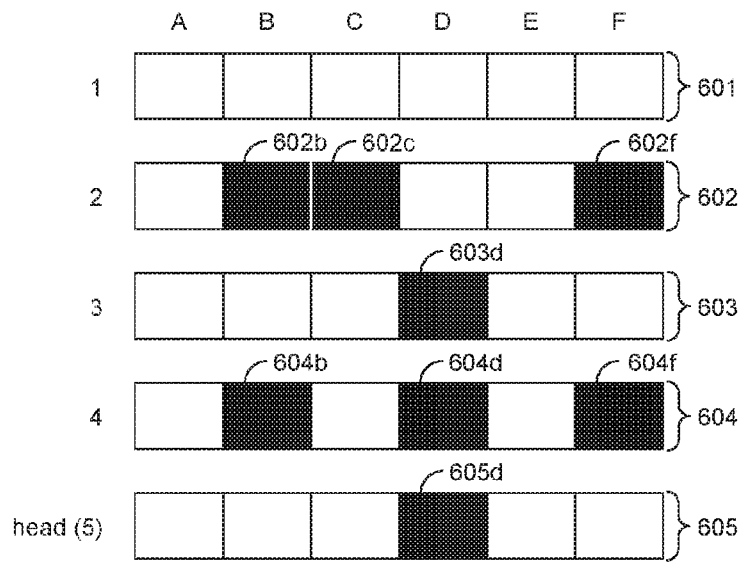
FIGS. 6A-6C are data structure diagrams representing changes to a filesystem over time, and corresponding entries in an expiration data structure and a count data structure.

FIGS. 6A-6C are data structure diagrams representing changes to a filesystem over time, and corresponding entries in an expiration data structure and a count data structure in accordance with some embodiments of the disclosed facility. FIG. 6A is a display diagram illustrating changes to blocks of a filesystem at different points in time. In this example, various changes to six different blocks (A-F) of the filesystem are represented at 5 different points in time (601-605). In this example, version 601 represents the blocks of a pre-existing file when it was first recorded in a snapshot at time 1 (the earliest recorded snapshot for these blocks) and version 605 represents the blocks at a current time (referred to as the head version). Thus, in this example, four snapshots have been generated, and modifications to the blocks that have not been stored in a snapshot are represented at time 605. In this example, shaded regions 602b, 602c, 602f, 603d, 604b, 604d, 604f, and 605d represent changes or writes to the corresponding blocks during a corresponding epoch (and recorded in the corresponding snapshot). For example, shaded region 602b represents a write to block B during epoch 2 that is recorded in snapshot 2. Similarly, shaded region 604d represents a write to block D during epoch 4 that is recorded in snapshot 4.

FIG. 6B is a block diagram illustrating an expiration data structure in accordance with some embodiments of the disclosed facility. In this example, expiration data structure 610 stores information related to the changes to the blocks represented in FIG. 6A in each of several rows 611-618 and columns, including a birthdate column 619a, an expiration date column 619b, and an identification column 619c. For example, each of entries 611-618 includes, for one write represented in FIG. 6A, a birthdate (i.e., the snapshot in which the information was recorded), an expiration date (i.e., the epoch during which the information was overwritten), and an identifier for the block. For example, entry 611 corresponds to the write represented by shaded region 602b, which caused the facility to update the expiration data structure and count data structure as a result of the pre-existing value being overwritten and thereby "expiring" (i.e., no longer being the current value for the corresponding block). In other words, this entry was added to the expiration data structure in response to the write corresponding to shaded region 602b. The value or values recorded in snapshot 1 for block B at time 2 have: a birthdate corresponding to snapshot 1 (because this was the first snapshot during which information for the block was recorded) and an expiration date corresponding to snapshot 2 (since the value or values were overwritten during epoch 2 and recorded in snapshot 2). As another example, entry 612 corresponds to the write represented by shaded region 604b, which caused the facility to update the expiration data structure and count data structure as a result of the pre-existing value (i.e., the value written during epoch 2 and recorded in snapshot 2) being overwritten or deleted and thereby "expiring" (i.e., no longer being the current value for the corresponding block). In other words, this entry was added to the expiration data structure in response to the write corresponding to shaded region 604b. As a result, the value or values recorded in snapshot 2 for block B have: a birthdate corresponding to snapshot 2 and an expiration date corresponding to snapshot 4 (since the previously-recorded value or values in snapshot 2 were overwritten or deleted during epoch 4 and recorded in snapshot 4). One skilled in the art will appreciate that while FIG. 6B provides an illustration that is easily comprehensible by a human reader, the actual information may be stored using different data structures and data organizations, such as a tree structure (e.g., binary tree, b-tree, timestamped tuple tree, etc.), comma separated values files, list, and so on and include additional information.

FIG. 6C is a block diagram illustrating a count data structure in accordance with some embodiments of the disclosed facility. In this example, count data structure 620 represents the size of the expired information currently stored in each of the various snapshots. In this example, count data structure 620 includes several entries represented by rows 621-625, each entry includes a birthdate (column 627), an expiration date (column 628), and a count (column 629) and represents the number of expired blocks having the corresponding birthdates and expiration dates. For example, entry 623 has a birthdate corresponding to snapshot 2, an expiration date corresponding to snapshot 4, and a count of 2. Accordingly, the snapshot data includes 2 blocks that have a birthdate corresponding to snapshot 2 and an expiration date corresponding to snapshot 4. These two blocks (snapshot elements in this example) are represented by entries 612 and 616 in expiration data structure 610 and correspond to the writes represented by shaded regions 604b and 604f. In this example, the snapshot elements represented are all of a fixed block size. Accordingly, the size of the represented data in the expired snapshot elements can be calculated by multiplying the filesystem block size (e.g., cluster size) by a count value stored in the count data structure. In some embodiments, the count data structure may store actual size values for the represented snapshot elements if, for example, the snapshot elements are of varying sizes, etc. One skilled in the art will appreciate that while FIG. 6C provides an illustration that is easily comprehensible by a human reader, the actual information may be stored using different data structures and data organizations, such as a tree structure (e.g., binary tree, b-tree, timestamped tuple tree, etc.), comma separated values file, list, and so on and may include additional information.

Figure 7:
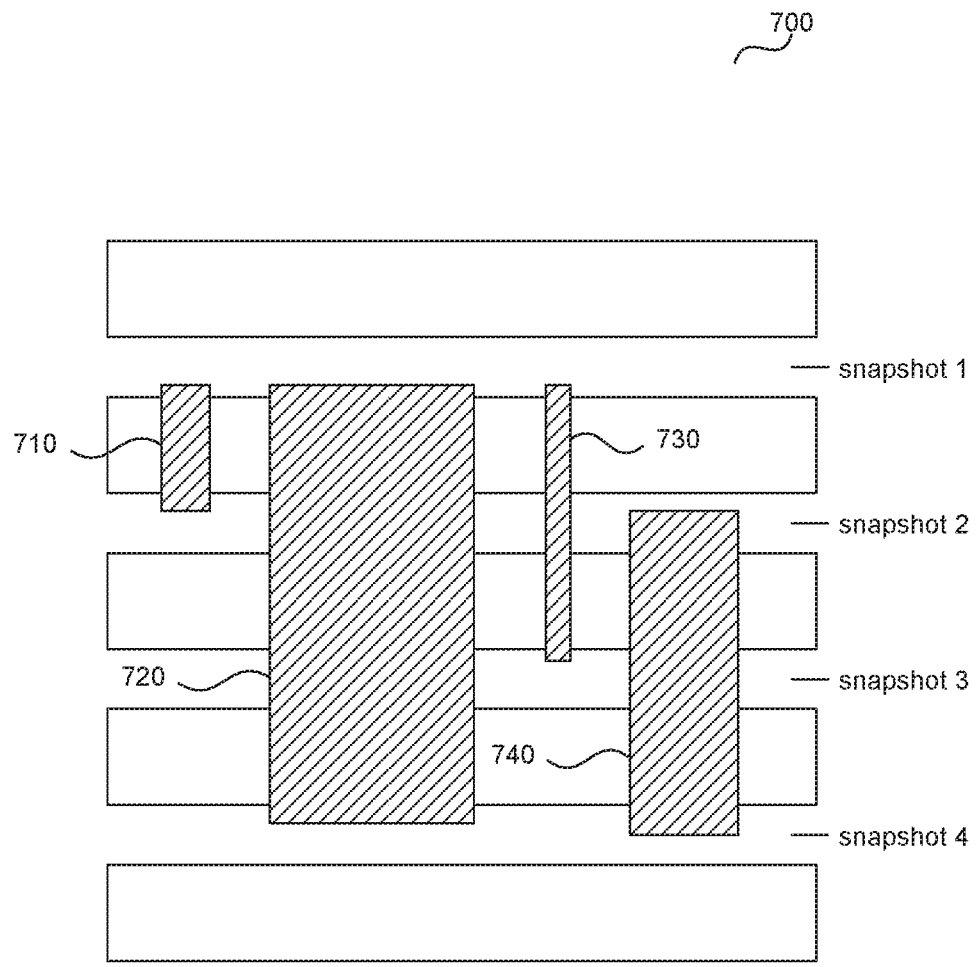
FIG. 7 is a display diagram illustrating a user interface that may be generated using the disclosed data structures and techniques.

FIG. 7 is a display diagram illustrating a graphical user interface 700 that may be generated using the disclosed data structures and techniques in accordance with some embodiments of the disclosed facility. In this example, the width of each of graphical user interface elements 710-740 (shaded regions in this example) represents a size of expired snapshot elements that span the corresponding snapshots. Thus, widths of the shaded regions represent the amount of storage space that would be reclaimed if the corresponding snapshot or snapshots were purged. For example, the width of shaded region 710 represents the size of the expired snapshot elements that span from snapshot 1 (inclusive) to snapshot 2 (exclusive) (i.e., that have a birthdate corresponding to snapshot 1 and an expiration date corresponding to snapshot 2) and, therefore, the amount of storage space that would be reclaimed if snapshot 1 alone was purged. The width of shaded region 720 represents the size of the expired snapshot elements that span from snapshot 1 to snapshot 4. The width of shaded region 730 represents the size of the expired snapshot elements that span from snapshot 1 to snapshot 3. The width of shaded region 740 represents the size of the expired snapshot elements that span from snapshot 2 to snapshot 4. The facility generates each of the shaded regions by querying the count data structure for each of the pairs represented therein (e.g., by traversing the data structure) as well as retrieving the corresponding size for each pair. Thus, each shaded regions corresponds to one entry in the count data structure. The height of each shaded region can be determined based on the range of snapshots represented by the corresponding entries in the count data structure (i.e., the (possibly expanded) birthdates and expiration dates) and the width of each shaded region corresponds to the size value stored for the entries. In some embodiments, the facility uses varying colors, patterns, etc. to reflect the size of the data that would be reclaimed if the corresponding snapshot or snapshots were purged in the graphical user interface. For example, the facility may shade regions red if purging the corresponding snapshots would result in more than a predetermined amount (e.g., 1 GB, 10 GB, 100 GB, 1 TB) or percentage (e.g., 10%, 20%, 50%, 75%) of the space taken up by snapshot data and green if purging the corresponding snapshots would result in less than a predetermined amount (e.g., 1 MB, 10 MB, 10 TB, 10 TB) or percentage (e.g., 5%, 30%, 80%, 90%) of the space taken up by snapshot data. In some embodiments, the facility may allow a user or users to interact with displayed graphical user interface elements representative of snapshot data that would be recovered if one or more corresponding snapshots were purged. For example, in some embodiments, a selection (e.g., click, mouseover, hover, long-press, etc.) of shaded region 730 causes the facility to display information about the corresponding snapshots, such as an indication of the amount of information that would be recovered if snapshots 1 and 2 were purged, a timestamp for the newest and/or oldest snapshot element that would be deleted if snapshots 1 and 2 were purged, and so on. In some embodiments, the facility enables a user to select one or more shaded regions, purges the corresponding snapshots in response to a user action (e.g., selection of a "purge" button or menu options), and redisplays the graphical user interface to reflect the changes. In some embodiments, in response to a user selection of a graphical user interface element, the facility merges the selected graphical user interface element with other graphical user interface elements that represent snapshot data that would be recovered if the snapshots corresponding to the selected graphical user interface element were purged. For example, selecting graphical user interface element 720 would cause graphical user interface elements 710 and 730 to merge with graphical user interface element 720 because the snapshots corresponding to each of graphical user interface elements 710 and 730 are within the range of snapshots corresponding to graphical user interface element 720.

From the foregoing, it will be appreciated that specific embodiments of the invention have been described herein for purposes of illustration, but that various modifications may be made without deviating from the scope of the invention. For example, a virtual machine can be snapshotted by performing block-based snapshots against the virtual machine's hard drive(s). In this case, the snapshotted blocks of the hard drive(s) could be accounted for, as described herein, for the virtualization environment rather than a filesystem. For example, one skilled in the art will appreciate that while the Figures provide illustrations that are easily comprehensible by a human reader, the actual information may be stored using different data structures and data organizations. Accordingly, the invention is not limited except as by the appended claims.

We claim:

1. A method, performed by a computing system having one or more processors, for snapshot space accounting in a storage system, the method comprising:
 receiving a request to write to a plurality of blocks of data within the storage system; and
 in response to receiving the request to write to the plurality of blocks of data,
  determining a current value for an epoch counter;
  for each block of the plurality of blocks of data,
   determining a previous birthdate associated with the block,
   adding an expiration entry to an expiration data structure, wherein the expiration entry includes:
    the determined previous birthdate for the block,
    the current value for the epoch counter, and
    an identifier for the block; and
   determining that a count data structure includes an entry for a pair of snapshot values, the first snapshot value in the pair of snapshot values corresponding to the determined previous birthdate for the block and the second snapshot value in the pair of snapshot values corresponding to the current value for the epoch counter, and
   in response to determining that the count data structure includes an entry for the pair of snapshot values, increasing a size associated with the entry by a size of the block of data.

2. The method of claim 1, further comprising:
 writing to each of the plurality of blocks of data within the storage system; and
 storing, for each block, an indication of the current value for the epoch counter.

3. The method of claim 1, further comprising:
 receiving a request to determine the amount of storage space that would be recovered if at least one snapshot identified by the received request to determine the amount of storage space that would be recovered if at least one snapshot identified by the received request were purged;
 in response to receiving the request, determining at least one range of two or more snapshots based at least in part on the at least one snapshot identified by the received request to determine the amount of storage space that would be recovered if at least one snapshot identified by the received request were purged;
 generating a set of one or more chronologically-ordered snapshot pairs based at least in part on the determined range; and
 for at least one chronologically-ordered snapshot pair of the generated set of one or more chronologically-ordered snapshot pairs,
  querying the count data structure, and
  determining a size for the chronologically-ordered snapshot pair based at least in part on a result of querying the count data structure.

4. The method of claim 3, wherein determining the at least one range of two or more snapshots based at least in part on the at least one snapshot identified by the received request were purged comprises:
 identifying one or more previously deleted snapshots that are chronologically adjacent to the at least one snapshot.

5. The method of claim 3, wherein determining the size for at least one chronologically-ordered snapshot pair comprises:

receiving a query result for the at least one chronologically-ordered snapshot pair comprising a count value; and generating a value based at least in part on the count value and a predetermined block size.

6. The method of claim 1, further comprising:

receiving a request to purge at least one snapshot; and in response to receiving the request to purge the at least one snapshot,
  identifying a range of snapshots corresponding to the at least one snapshot,
    wherein a first snapshot in the identified range of snapshots represents a birthdate of snapshot elements to be deleted and wherein a second snapshot in the identified range of snapshots represents an expiration date of snapshot elements to be deleted,
  identifying one or more snapshot pairs based at least in part on the identified range of snapshots, and
  for each snapshot pair of one or more of the identified one or more snapshot pairs,
    identifying at least one snapshot element,
    deleting the identified at least one snapshot element,
    removing, from the expiration data structure, at least one entry corresponding to the identified at least one snapshot element, and
    decrementing a value stored in the count data structure for the snapshot pair.

7. The method of claim 1, further comprising:

for each of a plurality of chronologically-ordered snapshot pairs,
  retrieving, from the count data structure, a value corresponding to the chronologically-ordered snapshot pair,
  providing information usable to generate a graphical user interface element indicative of an amount of data that would be recovered if one or more snapshots corresponding to the chronologically-ordered snapshot pair were purged,
  causing the graphical user interface element indicative of the amount of data that would be recovered if one or more snapshots corresponding to the chronologically-ordered snapshot pair were purged to be displayed.

8. The method of claim 7, wherein a width of a first graphical user interface element caused to be displayed for a first chronologically-ordered snapshot pair of the plurality of chronologically-ordered snapshot pairs is determined based at least in part on the value retrieved from the count data structure for the first chronologically-ordered snapshot pair, and wherein a height of the first graphical user interface element is determined based at least in part on a difference between an identifier of each snapshot of the first chronologically-ordered snapshot pair.

9. The method of claim 1, further comprising:

receiving an indication that a new snapshot has been generated; and in response to receiving the indication that the new snapshot has been generated, incrementing the epoch counter.

10. A computer-readable medium storing instructions that, if executed by a computing system having a memory and a processor, cause the computing system to perform a method comprising:

receiving a request to write to a plurality of blocks of data within a storage system; and in response to receiving the request to write to the plurality of blocks of data, determining a current value for an epoch counter;

for each block of the plurality of blocks of data, determining a previous birthdate associated with the block,
  adding an expiration entry to an expiration data structure, wherein the expiration entry includes:
    the determined previous birthdate for the block,
    the current value for the epoch counter, and
    an identifier for the block; and
  determining that a count data structure includes an entry for a pair of snapshot values, the first snapshot value in the pair of snapshot values corresponding to the determined previous birthdate for the block and the second snapshot value in the pair of snapshot values corresponding to the current value for the epoch counter, and
  in response to determining that the count data structure includes an entry for the pair of snapshot values, increasing a size associated with the entry by a size of the block of data.

11. The computer-readable medium of claim 10, further comprising:

receiving an indication that a new snapshot has been generated; and in response to receiving the indication that the new snapshot has been generated, incrementing the epoch counter.

12. The computer-readable medium of claim 11, further comprising:

writing to each of the plurality of blocks of data within the storage system; and storing, for each block, an indication of the current value for the epoch counter.

13. The computer-readable medium of claim 10, the method further comprising:

receiving a request to determine the amount of storage space that would be recovered if at least one snapshot identified by the received request to determine the amount of storage space that would be recovered if at least one snapshot identified by the received request were purged;

in response to receiving the request, determining at least one range of two or more snapshots based at least in part on the at least one snapshot identified by the received request to determine the amount of storage space that would be recovered if at least one snapshot identified by the received request were purged;

generating a set of one or more chronologically-ordered snapshot pairs based at least in part on the determined range; and for at least one chronologically-ordered snapshot pair of the generated set of one or more chronologically-ordered snapshot pairs,
  querying the count data structure, and
  determining a size for the chronologically-ordered snapshot pair based at least in part on a result of querying the count data structure.

14. The computer-readable medium of claim 10, further comprising:

for each of a plurality of chronologically-ordered snapshot pairs,
  retrieving, from the count data structure, a value corresponding to the chronologically-ordered snapshot pair,
  providing information usable to generate a graphical user interface element indicative of an amount of data that would be recovered if one or more snapshots corresponding to the chronologically-ordered snapshot pair were purged, causing the graphical user interface element indicative of the amount of data that would be recovered if one or more snapshots corresponding to the chronologically-ordered snapshot pair were purged to be displayed.

15. A computing system comprising:

at least one memory that includes instructions;

at least one processor, wherein execution of the instructions enables actions, including:

receiving a request to write to a plurality of blocks of data within a storage system; and in response to receiving the request to write to the plurality of blocks of data, determining a current value for an epoch counter; and for each block of the plurality of blocks of data, determining a previous birthdate associated with the block;

adding an expiration entry to an expiration data structure, wherein the expiration entry includes:

the determined previous birthdate for the block, the current value for the epoch counter, and an identifier for the block; and determining that a count data structure includes an entry for a pair of snapshot values, the first snapshot value in the pair of snapshot values corresponding to the determined previous birthdate for the block and the second snapshot value in the pair of snapshot values corresponding to the current value for the epoch counter, and in response to determining that the count data structure includes an entry for the pair of snapshot values, increasing a size associated with the entry by a size of the block of data.

16. The computing system of claim 15, further comprising:

receiving an indication that a new snapshot has been generated; and in response to receiving the indication that the new snapshot has been generated, incrementing the epoch counter.

17. The computing system of claim 15, further comprising:

writing to each of the plurality of blocks of data within the storage system; and storing, for each block, an indication of the current value for the epoch counter.

18. The computing system of claim 15, further comprising:

receiving a request to determine the amount of storage space that would be recovered if at least one snapshot identified by the received request to determine the amount of storage space that would be recovered if at least one snapshot identified by the received request were purged;

in response to receiving the request, determining at least one range of two or more snapshots based at least in part on the at least one snapshot identified by the received request to determine the amount of storage space that would be recovered if at least one snapshot identified by the received request were purged;

generating a set of one or more chronologically-ordered snapshot pairs based at least in part on the determined range; and for at least one chronologically-ordered snapshot pair of the generated set of one or more chronologically-ordered snapshot pairs, querying the count data structure, and determining a size for the chronologically-ordered snapshot pair based at least in part on a result of querying the count data structure.

19. The computing system of claim 15, further comprising:

for each of a plurality of chronologically-ordered snapshot pairs, retrieving, from the count data structure, a value corresponding to the chronologically-ordered snapshot pair, providing information usable to generate a graphical user interface element indicative of an amount of data that would be recovered if one or more snapshots corresponding to the chronologically-ordered snapshot pair were purged, causing the graphical user interface element indicative of the amount of data that would be recovered if one or more snapshots corresponding to the chronologically-ordered snapshot pair were purged to be displayed.

* * * * *